United States Patent
Slusarczyk et al.

(10) Patent No.: US 9,719,572 B2
(45) Date of Patent: Aug. 1, 2017

(54) HYDRAULIC DAMPER

(71) Applicant: BeijingWest Industries, Co., Ltd., Beijing (CN)

(72) Inventors: Pawel Slusarczyk, Cracow (PL); Jakub Wrzesinski, Cracow (PL); Robert Kapolka, Cracow (PL)

(73) Assignee: BEIJINGWEST INDUSTRIES CO., LTD, Beijing (CN)

( * ) Notice: Subject to any disclaimer, the term of this patent is extended or adjusted under 35 U.S.C. 154(b) by 0 days.

(21) Appl. No.: 14/431,901

(22) PCT Filed: Jul. 12, 2013

(86) PCT No.: PCT/CN2013/079297
§ 371 (c)(1),
(2) Date: Mar. 27, 2015

(87) PCT Pub. No.: WO2015/003385
PCT Pub. Date: Jan. 15, 2015

(65) Prior Publication Data
US 2015/0240902 A1    Aug. 27, 2015

(51) Int. Cl.
*F16F 9/348*    (2006.01)

(52) U.S. Cl.
CPC ............ *F16F 9/3485* (2013.01); *F16F 9/348* (2013.01); *F16F 9/3482* (2013.01); *F16F 9/3488* (2013.01)

(58) Field of Classification Search
CPC .......... F16F 9/512; F16F 9/516; F16F 9/3485; F16F 9/3482; F16F 9/5126; F16F 9/348;
(Continued)

(56) References Cited

U.S. PATENT DOCUMENTS 6,460,664 B1 * 10/2002 Steed ............... F16F 9/348
188/282.1
2001/0023801 A1 * 9/2001 Fenn ................ F16F 9/3405
188/322.15

(Continued)

FOREIGN PATENT DOCUMENTS

CN       103026094 A    6/2011
DE    102004014395 A1   11/2004
(Continued)

OTHER PUBLICATIONS

DE-102004014395, Machined translation of Description.*
The State Intellectual Property Office of China, Third Office Action and Search Report, Issued Feb. 4, 2017.

*Primary Examiner* — Robert A Siconolfi
*Assistant Examiner* — San Aung
(74) *Attorney, Agent, or Firm* — William H. Honaker; Dickinson Wright PLLC

(57) ABSTRACT

A hydraulic damper (2) includes a first piston body member (233), a second piston body member (234), a third piston body member (235), and a compression stroke disc assembly (231) compressed at a radially inner side thereof between the first (233) and said second (234) piston body members. The hydraulic damper includes a rebound stroke disc assembly (232) compressed at the radially inner side thereof between the second (234) and third (235) piston body members, and the compression stroke disc assembly (231) additionally includes an annular supporting member (2319) positioning discs (2311-2318) of the compression stroke disc assembly (231) at radially inner side thereof, while a radially inner axial passage (23191) is defined at the radially inner side of the supporting member (2319).

6 Claims, 4 Drawing Sheets

(58) Field of Classification Search
CPC ........ F16F 9/466; F16F 9/3405; F16F 9/3214;
F16F 9/3484; F16F 9/34; F16F 9/504;
F16F 2228/04; B60G 17/08; Y10T
137/7839; Y10T 137/88054
USPC .................. 188/322.15, 322.14, 322.13, 313
See application file for complete search history.

(56) References Cited

U.S. PATENT DOCUMENTS

| | | | |
|---|---|---|---|
| 2002/0078997 A1* | 6/2002 | Asadi .................... | F16F 9/3214 137/512.1 |
| 2002/0134629 A1 | 9/2002 | Bataille et al. | |
| 2004/0154663 A1* | 8/2004 | Honig .................... | F16F 9/348 137/455 |
| 2009/0236194 A1 | 9/2009 | Kim | |
| 2012/0181126 A1* | 7/2012 | de Kock ............... | F16F 9/3488 188/282.8 |
| 2013/0020159 A1* | 1/2013 | Groves ................ | F16F 9/3484 188/313 |

FOREIGN PATENT DOCUMENTS

| | | |
|---|---|---|
| DE | 102004060485 A1 | 7/2005 |
| EP | 0889258 A1 | 7/1999 |
| JP | 2012-026560 | 9/2012 |
| WO | 2012-014618 A1 | 2/2012 |

\* cited by examiner (state of art)

(state of art)

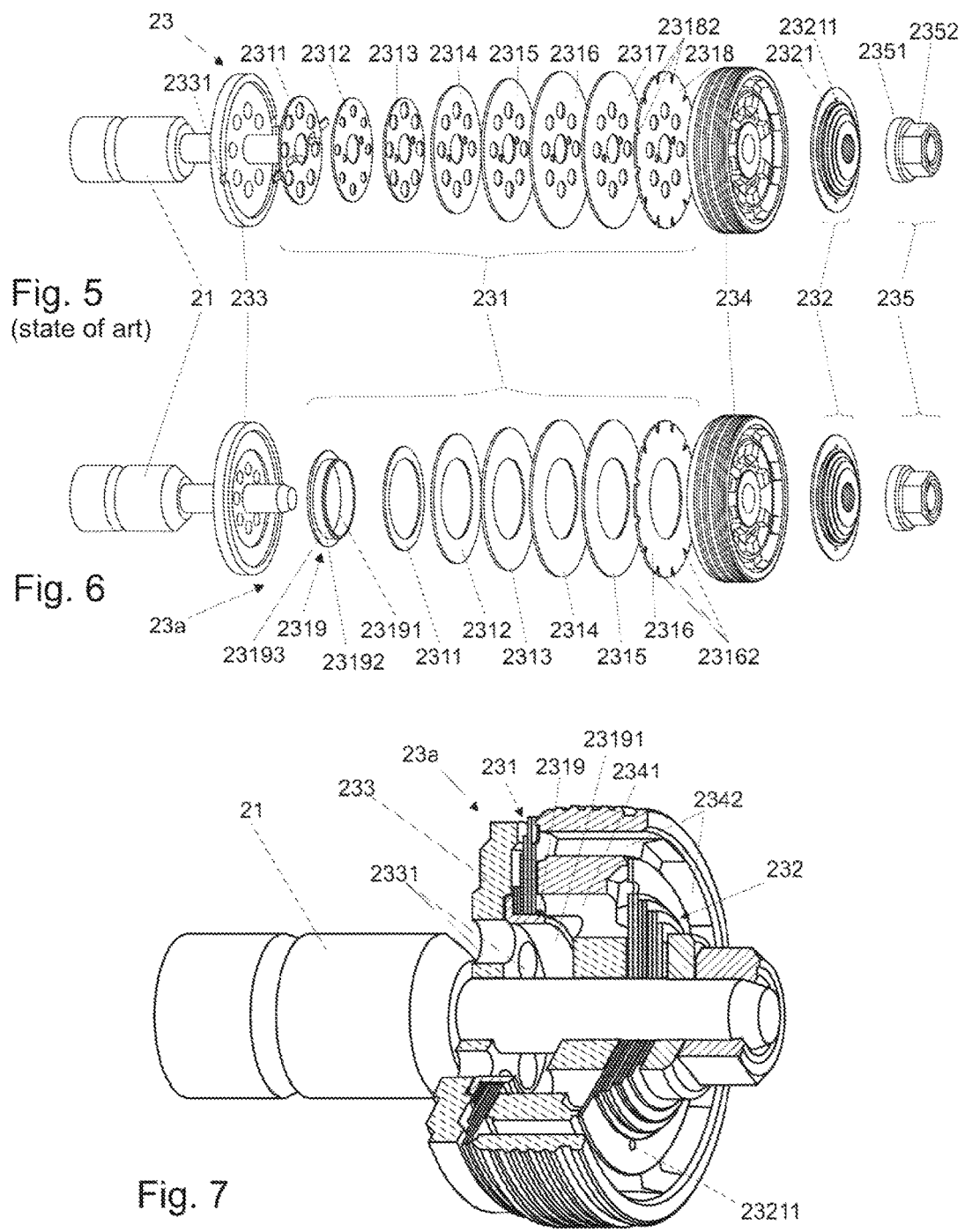

HYDRAULIC DAMPER

CROSS REFERENCE TO RELATED APPLICATION

This application claims the benefit of PCT International Application Serial No. PCT/CN2013/079297 filed on Jul. 12, 2013 and entitled a "Hydraulic Damper", the entire disclosure of which is incorporated herein by reference.

FIELD OF THE INVENTION

The present invention relates to a hydraulic damper, in particular a motor vehicle suspension damper comprising a tube filled with working liquid, a piston rod led outside the tube through a piston rod guide, and a piston assembly disposed slidably inside the tube dividing the tube into a compression and rebound chamber and comprising:
a first piston body member provided with at least one radially inner axial passage and at least one radially outer axial passage;
a second piston body member provided with at least one radially inner axial passage and at least one radially outer axial passage;
a third piston body member to compressively secure the piston assembly to the piston rod;
a compression stroke disc assembly compressed at the radially inner side thereof between said first and said second piston body members, deflectably covering said at least one radially outer axial passage of the second piston body member and provided with at least one radially inner axial passage in fluid connection with said at least one radially inner axial passage of the first piston body member and said at least one radially inner axial passage of the second piston body member and
a rebound stroke disc assembly compressed at the radially inner side thereof between said second and said third piston body members, deflectably covering said at least one radially inner axial passage of the second piston body member.

BACKGROUND OF THE INVENTION

A hydraulic damper of this kind is known from patent application US 2002134629. It includes a compression stroke valve having one or more deflectable discs mounted on the piston on the rebound chamber side and a rebound stroke valve having one or more deflectable discs mounted on the piston on the compression chamber side. The deflectable discs of the compression stroke valve have fluid flow apertures aligned with the rebound flow passage. The compression stroke valve also has an annular stop member and an annular orientation disc positioned between the stop member and the deflectable discs on the side of the deflectable discs remote from the piston. The stop member and the orientation disc have fluid flow apertures aligned with fluid flow apertures in the deflectable discs. An orientation disc has a pin folded therefrom and extending in a direction substantially parallel to the longitudinal axis, the pin extending through corresponding apertures formed in the deflectable discs into a corresponding slot formed in the piston. Alignment means formed on the orientation disc and the stop member for aligning the orientation disc relative to the stop member, allow easier alignment of the compression stroke valve components.

International publication WO 2012/014618 discloses a similar damper provided with: a valve disc for defining the interior of a cylinder in which a working fluid is sealed; a port formed in the valve disc and connecting fluid chambers defined by the valve disc; an annular leaf valve capable of moving in the direction of the axis of the valve disc, the leaf valve being stacked on the valve disc and opening and closing the port according to the pressure difference between the fluid chambers; and a pressing mechanism for pressing the leaf valve in the direction in which the leaf valve closes the port. The pressing mechanism is provided with: a shaft member consisting of a non-magnetic material and having the leaf valve slidably disposed on the outer periphery thereof; and a movable magnet slidably disposed on the outer periphery of the shaft member and pressing, utilizing the magnetic force thereof, the leaf valve toward the valve disc.

Dampers of this kind may easily be provided with two separate mechanisms of generating damping force in dependence of the velocity of the piston rod.

If the speed of the rod is relatively low, working liquid flows from the compression chamber to the rebound chamber or in the opposite direction through appropriate passages of the first and the second piston body members and openings provided in disc or discs of the compression and/or rebound stroke assemblies but none of the discs deflects under the pressure of the working liquid.

Higher pressure of the working liquid that occurs for higher speeds of the piston rod leads to deflection of respective disc assemblies. Now during high speed compression stroke the working liquid flows from the compression chamber mainly through radially outer axial passages of the second piston body member, through the gap between the deflected discs of the compression stroke disc assembly that opens proportionally to the pressure of the working liquid and finally through radially outer axial passage to the rebound chamber. On the other hand, during high speed rebound stroke the working liquid flows mainly from the rebound chamber through radially inner axial passages of the first piston body member, radially inner axial passages of the compression stroke disc assembly, radially inner axial passages of the second piston body member and finally through the gap between the deflected discs of the rebound stroke disc assembly, that opens proportionally to the pressure of the working liquid, to the compression chamber.

Dampers of this kind also provide excellent tuning capabilities. By changing the number, diameters, widths of each disc of the compression and rebound disc assemblies, the number, diameters, widths of the axial passages in the first and the second piston body member and radially inner axial passages of the compression stroke disc assembly, as well as providing, if necessary, rebound and/or compression stroke disc assemblies with low speed rebound and compression openings of varying number and sizes one may define and fine-tune the damping force characteristics independently for a rebound and compression stroke of the damper.

Unfortunately to enable low speed fluid communication between the first and the second piston body member it is necessary not only to provide each disc of the compression stroke disc assembly with an axial passage but more importantly to independently secure angular position of each disc with regard to each other and with regard to the radially inner axial passages of the first and the second piston body member in order to properly align radially inner axial passages of the discs with inner axial passages of these piston body members.

It has been the object of the present invention to provide a damper that would alleviate the aforementioned discs positioning necessity, and therefore would allow for simplification and shortening the time of the damper assembling process, yet would not impose modification of the assembly line, would allow for using as much of the same elements of the piston assembly as possible and would reduce neither the damper performance nor its tuning capabilities.

SUMMARY OF THE INVENTION

In order to accomplish the aforementioned and other objects, in a damper of the kind mentioned in the outset, according to the present invention said compression stroke disc assembly additionally comprises an annular supporting member positioning the discs of said assembly at radially inner side thereof, while said radially inner axial passage is defined at the radially inner side of said supporting member.

Assembly process is therefore much simpler and yet the working surface (i.e. deflectable surface) of compression stroke disc assembly remains substantially the same as in a damper, where angular orientation of the discs has been required.

Preferably said annular supporting member has a form of a sleeve abutting said first piston body member or said second piston body member.

In an alternative embodiment said annular supporting member may have a form of an annular projection of said first piston body member and/or said second piston body member.

Preferably said compression stroke disc assembly and/or said rebound stroke disc assembly is/are provided with openings at their deflectable sides.

BRIEF DESCRIPTION OF DRAWINGS

The exemplary embodiments of the present invention are presented below in connection with the attached drawings on which:

FIG. 5 is a schematic exploded view of the piston assembly shown in FIG. 2 and FIG. 3;

FIG. 6 is a schematic exploded view of the piston assembly according to the present invention shown in FIG. 4;

FIG. 7 is a cross-sectional perspective view of the piston assembly shown in FIG. 4 and FIG. 6.

DETAILED DESCRIPTION OF PREFERRED EMBODIMENTS

Figure 1:
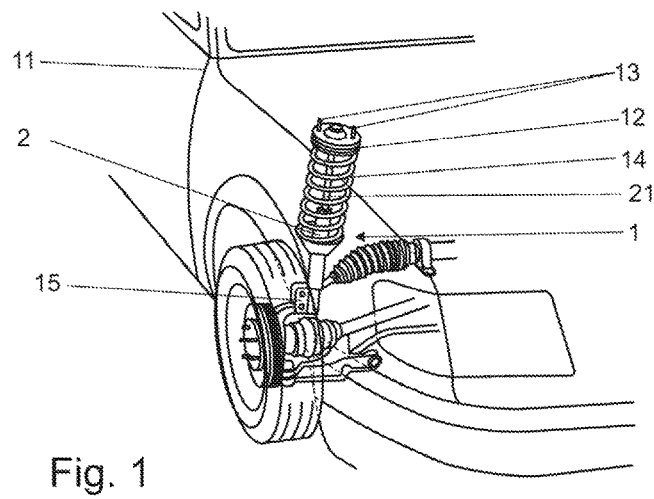
FIG. 1 schematically illustrates a front right motor vehicle suspension.

FIG. 1 schematically illustrates a fragment of an exemplary vehicle suspension 1 attached to a vehicle chassis 11 by means of a top mount 12 and a number of screws 13 disposed on the periphery of the upper surface of the top mount 12. The top mount 12 is connected to a coil spring 14 and a rod 21 of a mono- or twin-tube hydraulic damper 2. Inside a tube of the damper 2 a piston assembly attached to the rod 21 led outside the tube is slidably disposed. At the other end the damper tube is connected to the steering knuckle 15 or a swing arm supporting the vehicle wheel.

Figure 2:
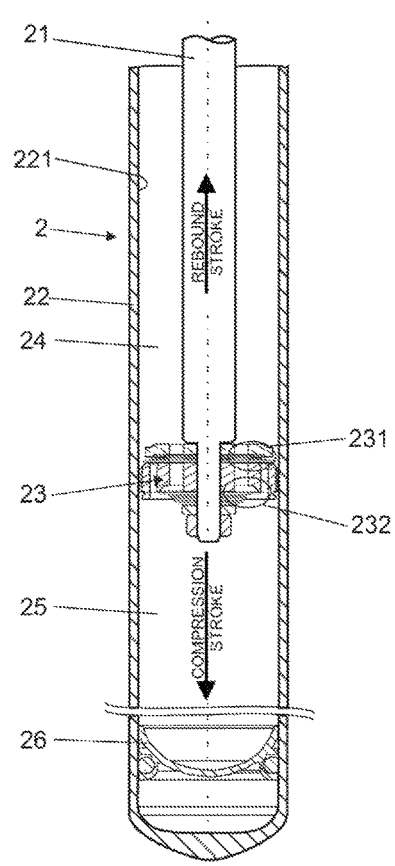
FIG. 2 is a schematic cross-sectional view of a fragment of a hydraulic damper according to the state of art.

A hydraulic damper 2 shown in part in FIG. 2 is an example of a mono-tube damper that may be employed in a vehicle suspension 1 presented in FIG. 1 which comprises a schematically depicted movable piston assembly 23 known from the state of art having two separate mechanisms of generating damping force in dependence of the velocity of the piston rod.

The piston assembly 23 makes a sliding fit with the inner surface 221 of the tube 22, dividing the tube 22 into a rebound chamber 24 (above the piston assembly) and a compression chamber 25 (below the piston assembly).

At one end the piston rod 21 passes through and is secured to the piston assembly 23. The other end of the piston rod 21 is led axially outside the damper 2 through a sealed rod guide (not shown). The piston assembly 23 is provided with compression 231 and rebound 232 valve assemblies to control the flow of working liquid passing between the rebound chamber 24 and the compression chamber 25 while the piston is in movement. At the compression end, the tube 22 is closed by the floating gas cup assembly 26 for pressure compensation.

Figure 3:
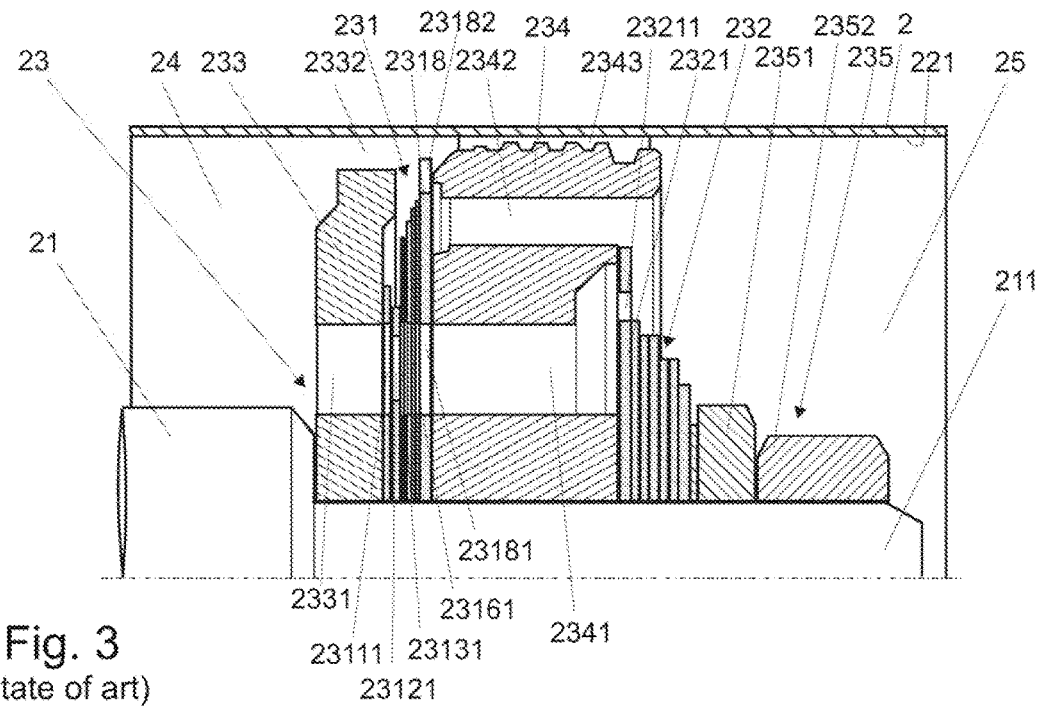
FIG. 3 is a schematic cross-sectional view of a fragment of a piston assembly shown in FIG. 2.

The term "rebound" as used in this specification with reference to particular elements of the damper means these elements or these parts of particular elements which point toward the piston rod or in a case of a flow direction of the working liquid it refers to this flow direction that takes place during the rebound stroke of a damper. Similarly the term "compression" as used herein with reference to particular elements of the damper means these elements or parts of elements which point in a direction opposite to the piston rod or in a case of a flow direction of the working liquid it refers to this flow direction that takes place during the compression stroke of a damper. Piston assembly 23 of FIG. 2 is shown in detail in FIG. 3 and FIG. 5. It comprises first piston body member 233 in a form of a retainer, a compression stroke disc assembly 231, a second piston body member 234 provided at the circumferential surface thereof with an annular sealing 2343 made of Teflon material, a rebound stroke disc assembly 232 and a third piston body member 235 having in this embodiment a form of a washer 2351 and a nut 2352 screwed on an external thread made at the end of a narrower cylindrical portion 211 of the piston rod 21 and compressively securing all the elements of the piston assembly 23.

The first piston body member 233 and the second piston body member 234 are provided with eight equiangularly disposed and aligned axial passages 2331 and 2341 (cf. FIG. 6). Furthermore the second piston body member 234 is provided with eight equiangularly disposed separate axial passages 2342 radially external with respect to the axial passages 2341. The first piston body member 233 defines an annular passage 2332 between the circumferential surface thereof and the inner surface 221 of the tube 22.

The compression stroke disc assembly 231 is compressed at the radially inner side thereof by the force exerted by the nut 2352 between the first 233 and the second 234 piston body members, deflectably covering axial passages 2342 of the second piston body member 234.

Similarly the rebound stroke disc assembly 232 is compressed at the radially inner side thereof between the second piston body member 234 and the retainer 2351 of the nut 2352, deflectably covering axial passages 2341 of the second piston body member 234.

Discs of the compression stroke disc assembly 231 and the rebound stroke disc assembly 232 have differentiated widths and diameters to enable tuning of the damping force characteristic.

For low speeds of the rod 21, during the compression stroke, working liquid flows from the compression chamber 25 to the rebound chamber 24 through two channels.

The first channel is defined by the two passages 23211 of the disc 2321 of the rebound disc assembly 232, axial passages 2341 of the second piston body member 234, axial passages 23111-23181 of the discs 2311-2318 of the compression disc assembly 231 (cf. FIG. 5) and axial passages 2331 of the first piston body member.

The second channel is defined by the passages 2342 of the second piston body member 234, twelve radial slots 23182 of the disc 2318 of the compression disc assembly 231 and the annular passage 2332 of the first piston body member 233.

For low speeds of the rod 21, during the rebound stroke, working liquid flows through the first and the second channels defined above from the rebound chamber 24 to the compression chamber 25 but in the opposite direction.

For low speeds of the rod 21 discs of the compression 231 or the rebound 232 disc assemblies do not deflect. They deflect after some rod velocity thresholds that may be tuned independently for a rebound and for a compression stroke. For this purpose it may be appropriate to provide disc valve assemblies 231 and 232 with slots, openings, unidirectional disc valves (e.g. disc with slots or openings covered by another disc) and various other means known to those skilled in the art.

After reaching this compression stroke threshold, working liquid flows mainly through the second channel and the gap between the deflected discs of the compression stroke disc assembly 231 while during the rebound stroke, working liquid flows mainly through the first channel and the gap between the deflected discs of the rebound stroke disc assembly 232. Obviously both gaps open proportionally to the pressure of the working liquid with an increase of the damping force.

Obviously in order to enable the flow of the working liquid through axial passages 23111-23181 of the discs 2311-2318 of the compression disc assembly 231, the discs 2311-2318 must be angularly aligned with each other which may create manufacturing, assembling and dimensional tolerance problems.

Figure 4:
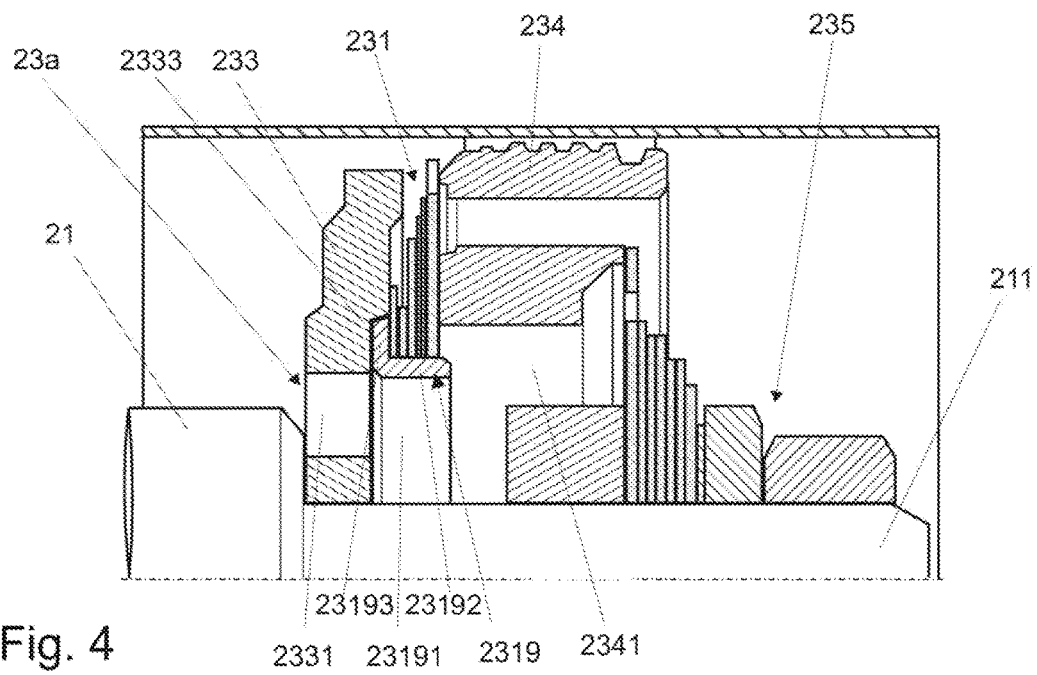
FIG. 4 is a schematic cross-sectional view of a fragment of an embodiment of a piston assembly according to the present invention.

FIGS. 4, 6, 7 illustrate an exemplary embodiment of the piston assembly 23a according to the present invention. The reference numerals corresponding to the same functional elements remain as in FIG. 3 and FIG. 5, with suffixes (a, b) added to distinguish particular embodiments of the piston assembly 23a and 23b.

As shown, in this embodiment of the piston assembly 23a, the compression stroke disc assembly 231 additionally comprises an annular supporting member 2319 in a form of a sleeve. Radial flange 23193 of the sleeve 2319 is seated within the annular recess 2333 of the first piston body member 233 and supports the discs 2311-2316 of the compression stroke disc assembly 231. The annular ring 23192 of the sleeve 2319 serves to radially position the discs 2311-2316 and defines an axial passage 23191 of the assembly 231. Such a configuration excludes the necessity for angular orientation of the discs of the compression stroke disc assembly 231.

Figure 8:
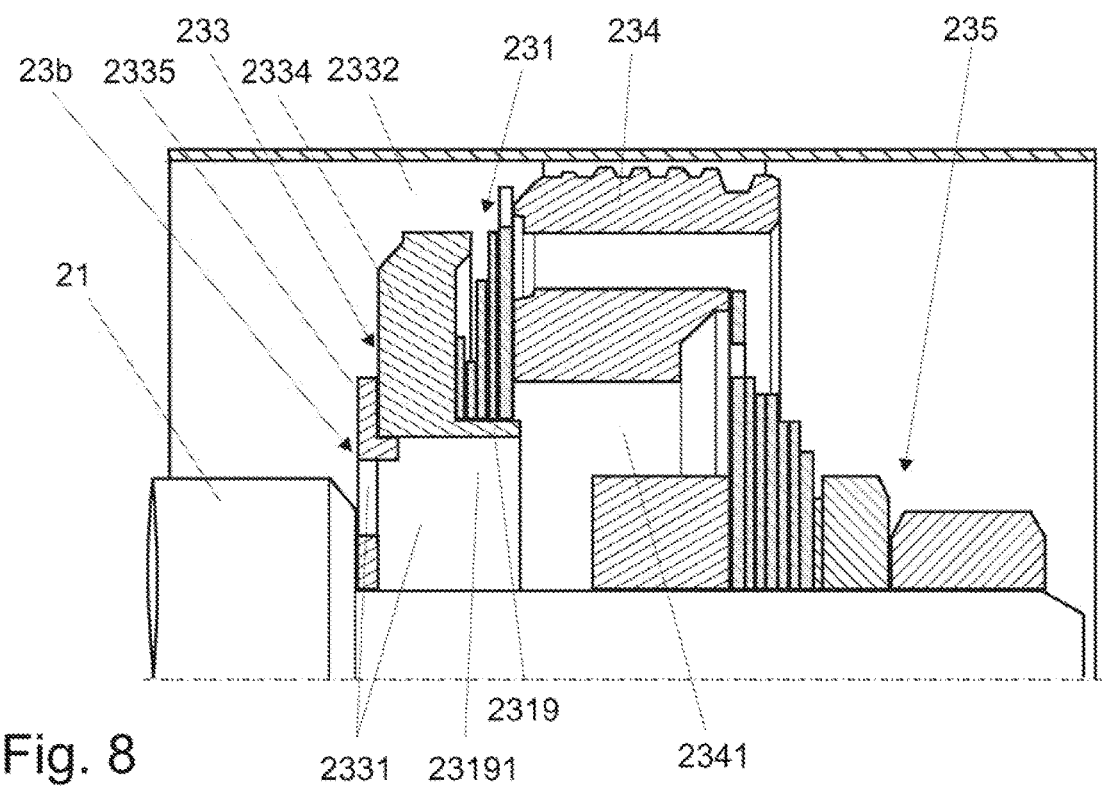
FIG. 8 is schematic cross-sectional view of a fragment of another embodiment of a piston assembly according to the present invention.

FIG. 8 shows yet another embodiment of the piston assembly 23b made according to the principles of the present invention. In this embodiment the first piston body member 233 comprises a retainer 2335 and a slidable piston member 2334 that defines an annular passage 2332 between the circumferential surface thereof and the inner surface 221 of the tube 22.

An annular supporting member 2319 for the discs of the compression stroke assembly 231 is defined by an annular projection of the slidable piston member 2334 of the first piston body member 233 so that radially inner axial passage 2331 of the first piston body member 233 and radially inner passage 23191 of the compression stroke disc assembly 231 form a single passage.

The above embodiments of the present invention are merely exemplary. The figures are not necessarily to scale, and some features may be exaggerated or minimized. These and other factors however should not be considered as limiting the spirit of the invention, the intended scope of protection of which is indicated in appended claims.

The invention claimed is:

1. A hydraulic damper (2), in particular a motor vehicle suspension damper comprising a tube (22) filled with working liquid, a piston rod (21) led outside the tube through a piston rod guide and a piston assembly (23) disposed slidably inside the tube (22) dividing the tube into a compression chamber (25) and a rebound chamber (24) and comprising:
   a first piston body member (233) provided with at least one radially inner axial passage (2331) and at least one radially outer axial passage (2332);
   a second piston body member (234) provided with at least one radially inner axial passage (2341) and at least one radially outer axial passage (2342);
   a third piston body member (235) to compressively secure the piston assembly (23) to the piston rod (21);
   a compression stroke disc assembly (231) compressed at the radially inner side thereof between said first (233) and said second (234) piston body members, deflectably covering said at least one radially outer axial passage (2342) of the second piston body member (234) and provided with at least one radially inner axial passage in fluid connection with said at least one radially inner axial passage (2331) of the first piston body member (233) and said at least one radially inner axial passage (2341) of the second piston body member (234); and
   a rebound stroke disc assembly (232) compressed at the radially inner side thereof between said second (234) and said third (235) piston body members, deflectably covering said at least one radially inner axial passage (2341) of the second piston body member (234);
   wherein said compression stroke disc assembly (231) additionally comprises an annular supporting member (2319) positioning the discs (2311-2318) of said assembly (231) at radially inner side thereof, while said radially inner axial passage (23191) is defined at the radially inner side of said supporting member (2319).

2. The hydraulic damper according to claim 1, wherein said annular supporting member (2319) has a form of a sleeve abutting said first piston body member (233) or said second piston body member (234).

3. The hydraulic damper according to claim 1, wherein said annular supporting member (2319) has a form of an annular projection of said first piston body member (233) and/or said second piston body member (234).

4. The hydraulic damper according to claim 1, wherein said compression stroke disc assembly (231) and/or said rebound stroke disc assembly (232) is/are provided with openings (23162, 23182; 23211) at their deflectable sides.

5. The hydraulic damper according to claim 1, wherein said at least one radially outer axial passage (2332) of said first piston body member (233) has a form of an annular channel between the circumferential surface of said first piston body member (233) and the inner surface (221) of the tube (22).

6. The hydraulic damper according to claim 1, wherein the hydraulic damper is a mono- or twin-tube damper.

\* \* \* \* \*